United States Patent [19]

Allen et al.

[11] Patent Number: 5,771,247

[45] Date of Patent: Jun. 23, 1998

[54] LOW LATENCY ERROR REPORTING FOR HIGH PERFORMANCE BUS

[75] Inventors: Michael Scott Allen, Austin; Ravi Kumar Arimilli, Round Rock; John Michael Kaiser, Cedar Park; William Kurt Lewchuk, Austin, all of Tex.

[73] Assignees: International Business Machines Corporation, Armonk, N.Y.; Motorola, Inc., Schaumburg, Ill.

[21] Appl. No.: 611,439

[22] Filed: Mar. 4, 1996

Related U.S. Application Data

[63] Continuation of Ser. No. 326,203, Oct. 3, 1994, abandoned.

[51] Int. Cl.[6] ............................................. G06F 11/10
[52] U.S. Cl. ..................... 371/40.1; 371/40.2; 371/49.1
[58] Field of Search .......................... 371/40.1, 40.2, 371/49.1, 49.2

[56] References Cited

U.S. PATENT DOCUMENTS

| | | | |
|---|---|---|---|
| 4,201,337 | 5/1980 | Lewis et al. | 371/37 |
| 4,317,201 | 2/1982 | Sedalis | 371/38 |
| 4,345,328 | 8/1982 | White | 371/38 |
| 4,604,750 | 8/1986 | Manton et al. | 371/38 |
| 4,646,312 | 2/1987 | Goldsbury et al. | 371/38 |
| 4,791,641 | 12/1988 | Hillis | 371/38 |
| 4,825,438 | 4/1989 | Bennett et al. | 371/8 |
| 4,942,579 | 7/1990 | Goodlander et al. | 371/51 |
| 5,070,474 | 12/1991 | Tuma et al. | 395/500 |
| 5,148,432 | 9/1992 | Gordon et al. | 371/10.1 |
| 5,247,626 | 9/1993 | Firoozmand | 395/250 |
| 5,249,279 | 9/1993 | Schmenk et al. | 395/425 |
| 5,274,646 | 12/1993 | Brey et al. | 371/40.1 |
| 5,291,496 | 3/1994 | Andaleon et al. | 371/3 |
| 5,313,475 | 5/1994 | Cromer et al. | 371/40.1 |
| 5,373,512 | 12/1994 | Brady | 371/40.1 |

OTHER PUBLICATIONS

IBM TDB, "Enhanced Addressing Error Detection System", vol. 34, No. 7B, pp. 31–37, Dec. 1991.

IBM TDB, "Error Correction Circuitry for Dynamic Random Access Memories", vol. 36, No. 08, Aug. 1983, pp. 681–682, Aug. 1993.

IBM TDB, "Control Store Reliability Enhancement Using Complement/Recomplement Techniques", vol. 34, No. 10A, Mar. 1982, pp. 291–283, Mar. 1992.

*Primary Examiner*—Paul P. Gordon
*Attorney, Agent, or Firm*—Mark E. McBurney; Casimer K. Salys

[57] ABSTRACT

A system and method are provided that use a determination of bad data parity and the state of an error signal (Derr__) as a functional signal indicating a specific type of error in a particular system component. If the Derr__ signal is active, the parity error recognized by the CPU was caused by a correctable condition in a data providing device. In this instance, the processor will read the corrected data from a buffer without reissuing a fetch request. When the CPU finds a parity error, but Derr__ is not active a more serious fault condition is identified (bus error or uncorrectable multibit error) requiring a machine level interrupt, or the like. And, when no parity is found by the CPU and Derr__ is not active, then the data is known to be valid and the parity/ECC latency is eliminated, thereby saving processing cycle time.

12 Claims, 5 Drawing Sheets

LOW LATENCY ERROR REPORTING FOR HIGH PERFORMANCE BUS

This is a continuation of application Ser. No. 08/326,203 filed Oct. 3, 1994 now abandoned.

CROSS REFERENCE TO RELATED APPLICATIONS

"Dual Latency Status and Coherency Reporting for A Multiprocessing System", U.S. Ser. No. 08/316,980, filed Oct. 3, 1994;

"System and Method for Determining Source of Data in a System with Intervening Caches", U.S. Ser. No. 08/317,256, filed Oct. 3, 1994;

"Queued Arbitration Mechanism for Data Processing System", U.S. Ser. No. 08/317,006, file Oct. 3, 1994.

"Method and Apparatus for Remote Retry in a Data Processing System", U.S. Ser. No. 08/316,978, filed Oct. 3, 1994;

"Array Clocking Method and Apparatus for Input/Output Subsystems", U.S. Ser. No. 08/316,976, filed Oct. 3, 1994;

"Data Processing System Having Demand Based Write Through Cache with Enforced Ordering", U.S. Ser. No. 08/316,979, filed Oct. 3, 1994;

"Coherency and Synchronization Mechanism for I/O Channel Controllers in a Data Processing System", U.S. Ser. No. 08/316,977, filed Oct. 3, 1994;

"Alternating Data Valid Control Signals for High Performance Data Transfer", U.S. Ser. No. 08/326,190, filed Oct. 3, 1994; and "Efficient Address Transfer Technique for a Data Processing System", U.S. Ser. No. 08/317,007, filed Oct. 3, 1994.

BACKGROUND OF THE INVENTION

1. Field of the Invention

The present invention generally relates to reducing the latency required to determine whether data received during a read operation by a central processing unit (CPU) from a memory, or other peripheral device is correct. More specifically, parity errors are used as an indicator to determine whether an ECC error may be present which requires corrective action by the data processing system.

2. Description of Related Art

It is well known to use parity and error checking and correction (ECC) to validate the reliability of data transferred between a central processing unit (CPU) and a memory, programmed input/output (PIO) device, or the like. U.S. Pat. Nos. 4,201,337; 4,317,201; and 4,345,328 illustrate typical parity and ECC schemes.

In order to provide this parity and ECC function, logic is required that will generate parity and ECC codes which correspond to a particular data value and are stored along with the data values in a system memory or I/O device. In most conventional systems the processor places a memory read request on the address bus. Prior to returning the requested data, the memory or PIO device performs the parity and ECC functions. The return of data to the processor is dependent on the outcome of this error checking operation. Therefore, latency exists between the time when the data is requested by the processor, and the time when the data, from the memory or I/O device is available for use. It can be seen that minimizing this latency period will increase processing speeds. Further, those skilled in the art will understand how it would be desirable for the memory and I/O devices to be able to communicate with the processor, and to determine which component in the data processing system is causing the error condition so that corrective action can be taken.

U.S. Pat. No. 5,291,496 discusses a fault-tolerant data processing system wherein parity bits are provided to a processor along with the data. The parity bits and data are checked in parallel and in a single operation. This reference does not show fetching and using the data prior to determining whether it has been validated by the parity or ECC operations.

U.S. Pat. No. 5,274,646 describes eliminating processor interruption upon the invocation and correct operation of a complemented/recomplemented error correction method.

U.S. Pat. No. 4,942,579 is a system which is capable of dynamically and transparently reconstructing lost data.

U.S. Pat. No. 4,791,641 shows a system for checking errors in a parallel processing system wherein the read and write operations for plural memories in the system are accomplished substantially simultaneously in order that the read and write operations can be treated as acting on a single word and a single error correcting code is generated.

U.S. Pat. No. 5,313,475 illustrates a system with an ECC function and parity interface scheme that allows parity checking and error correction code to decode simultaneously, which provides concurrent parity and ECC generation. However, this type of system will wait until the parity and ECC are decoded, before using the data.

U.S. Pat. No. 4,604,750 describes a system wherein it is possible to independently read a data word and its associated error correction code. When a data word is fetched from memory for the processor, the parity bits are checked to determine if an error has occurred. But, before the determination is completed, the memory controller forwards the data word with its parity bits to the processor. Fetching of a data word is not delayed by calculation of ECC code, or parity checking. In the event of an error, the error correction code is fetched and the memory location is corrected. The processor then re-fetches the data from the memory location having the corrected data. However, this reference does not disclose any means of determining which component in the system is responsible for the error, so that corrective action can be taken. Additionally, U.S. Pat. No. 4,604,750 requires memory to contain separate parity bits and ECC bits. This adds significant cost to large memory subsystems. Further, U.S. Pat. No. 4,604,750 relates only to "soft" error, such as when an alpha particle alters a bit in the memory data. This reference then corrects the data and stores it back into the same memory location assuming that the error is only temporary. This prior art system does not address a "hard" error wherein data is continuously stored incorrectly to a faulty bit location.

In prior art systems, the SBE corrected data would be placed back into the same memory location where the "hard" error is present and when the processor re-requests the data, the error occurs again. This cyclic activity in conventional systems will keep repeating until a time out occurs and a machine check interrupt is issued, thereby halting data processing operations.

Therefore it can be seen that a system, such as the present invention, which allows a processor to use data from a memory or PIO device without waiting for the parity or ECC operations to complete will save latency and improve system performance. Further, those skilled in the art will appreciate how providing a means of communicating between the memory or PIO device and the processor that determines which components are responsible for any errors would be desirable. Also, a system which allows processing operations to continue, even when "hard" bit errors are present would be advantageous.

SUMMARY OF THE INVENTION

In contrast to the prior art, the present invention allows a processor to begin using data from a memory or PIO device without the latency normally required for parity and ECC error checking. A processor places a memory read request on an address bus, indicating that data stored in a specific memory location is desired. Normally, the memory controller will withhold the "raw" data (unchecked and/or uncorrected) until it completes checking the parity and/or ECC bits. However, in the present invention, the memory controller sends the data to the processor in the next machine cycle. In the vast majority of cases, there will be no parity or ECC errors and the processor will use the data with no delay. Thus, the latency associated with checking for error is eliminated.

At the same time the raw data is being provided to the processor, the memory controller goes ahead and checks the data for parity and ECC. The processor also checks parity on the raw data. In the event that a parity error is found by the processor, it halts use of the data and discards it or saves it for further fault isolation. The present invention provides a Derr_ signal which is driven by the data provider and is checked by the processor after the raw data is received and a parity error is found. If no parity error is present, then the processor knows the raw data is valid and uses it without checking the state of the Derr_ signal. When, an error is found in memory, then the memory controller activates the Derr_ signal in a later clock cycle, which is read by the processor. The CPU then knows that the previously received data with bad parity is not due to a catastrophic system error. Further, the CPU knows that the corrected data will be provided by the memory controller once the memory controller has corrected the single bit error (via ECC). In this case, the data provider continues its own parity and ECC activities and updates an internal buffer with the corrected data. Thus, when a parity error is detected, the processor only has to be supplied the corrected data from the buffer, and is not required to re-request the data.

Also, in contrast to the prior art, the present invention allows processing to continue, even when a "hard" error is present. That is, if a single bit error (SBE) is detected, then it is corrected by ECC logic and the corrected data is written to the internal buffer. The processor is then sent the correct data from the buffer. In prior art systems, the SBE corrected data would be placed back into the same memory location where the "hard" error is present and when the processor re-requests the data, the error is again present. This cyclic activity in conventional systems will keep repeating until a time out occurs and a machine check interrupt is issued, thereby halting data processing operations.

Further, since the data provider, e.g. memory controller was the device that asserted the Derr_ signal, it is known that the error occurred in the data provider. In this manner the processor is informed that the system bus is not at fault, because the data previously sent was bad before it was placed on the system bus by the data provider, e.g. memory controller. If the processor had found bad data parity and the Derr_ signal had not been activated, then it would be known that a correctable error in the data provider was not the cause of the error and the system bus most likely caused the faulty data. Thus, the data provider and processor communicate with one another so that it can be determined what type of error occurred and which component was the source of the error, e.g. the memory, PIO device, system bus, or the like.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
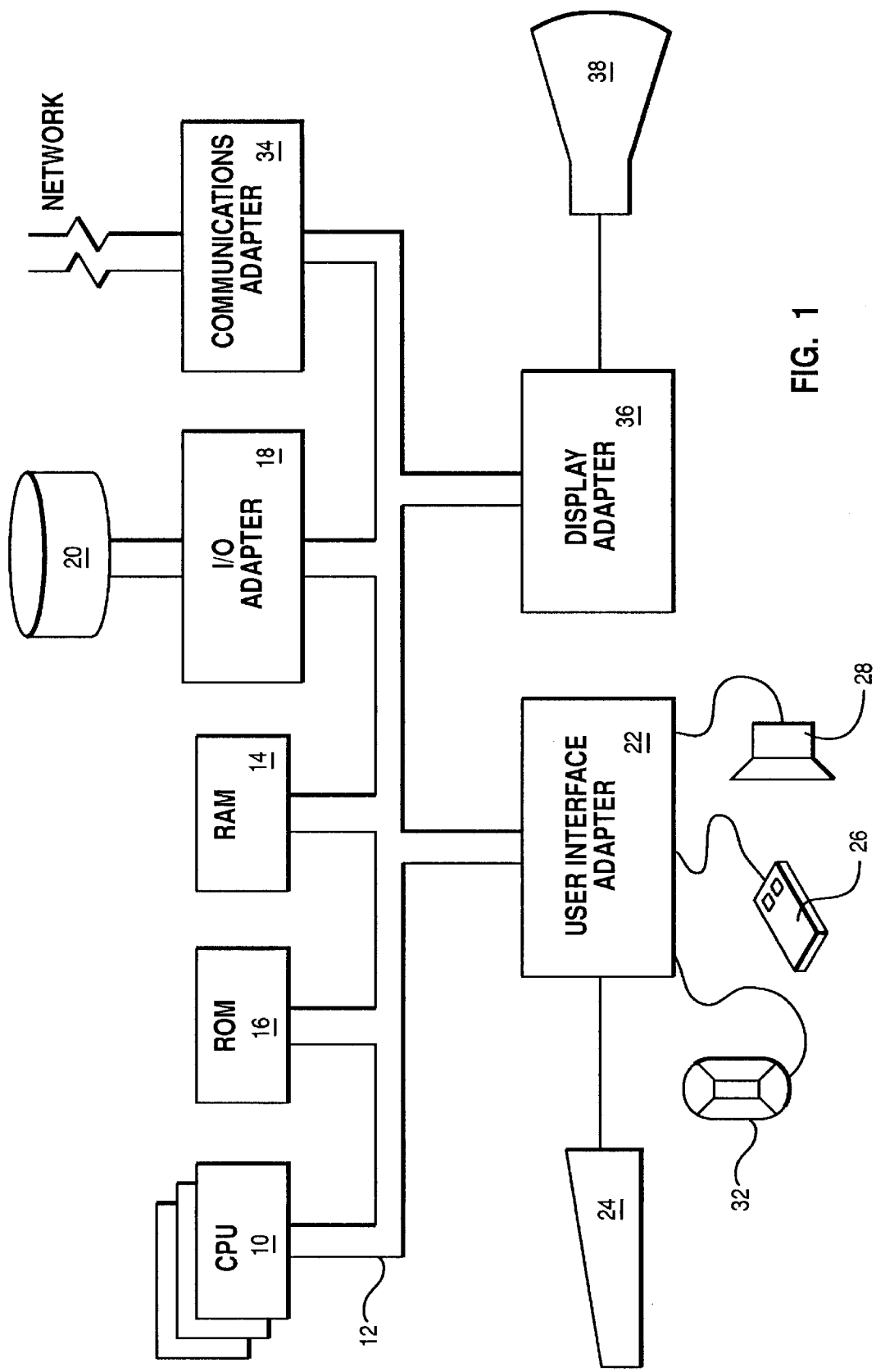
FIG. 1 is a block diagram showing the components of a typical data processing system capable of implementing the present invention.

Referring to FIG. 1, a typical data processing system is shown which may be used in conjunction with the present invention. The central processing unit (CPU) 10, may be one of the PowerPC microprocessors (PowerPC is a trademark of IBM) available from IBM. This processor is interconnected to the various other components by system bus 12. Read only memory (ROM) 16 is connected to CPU 10 via bus 12 and includes the basic input/output system (BIOS) that controls the basic computer functions. Random access memory (RAM) 14, input/output (I/O) adapter 18 and communications adapter 34 are also interconnected to system bus 12. I/O adapter 18 may be a small computer system interface (SCSI) adapter that communicates with a disk storage device 20. Communications 34 interconnects bus 12 with outside networks enabling the data processing system to communicate with other such systems. Input/output devices are also connected to system bus 12 via user interface adapter 22 and display adapter 36. Keyboard 23, track ball 32, mouse 26 and speaker 28 are all interconnected to bus 12 via user interface adapter 22. Display monitor 38 is connected to system bus 12 by display adapter 36. Additionally, the present invention contemplates the use of multiple processors connected to bus 12, each operating in parallel with one another. These processors may each implement the present invention when interacting with the memory subsystem, PIO devices, or the like.

Figure 2:
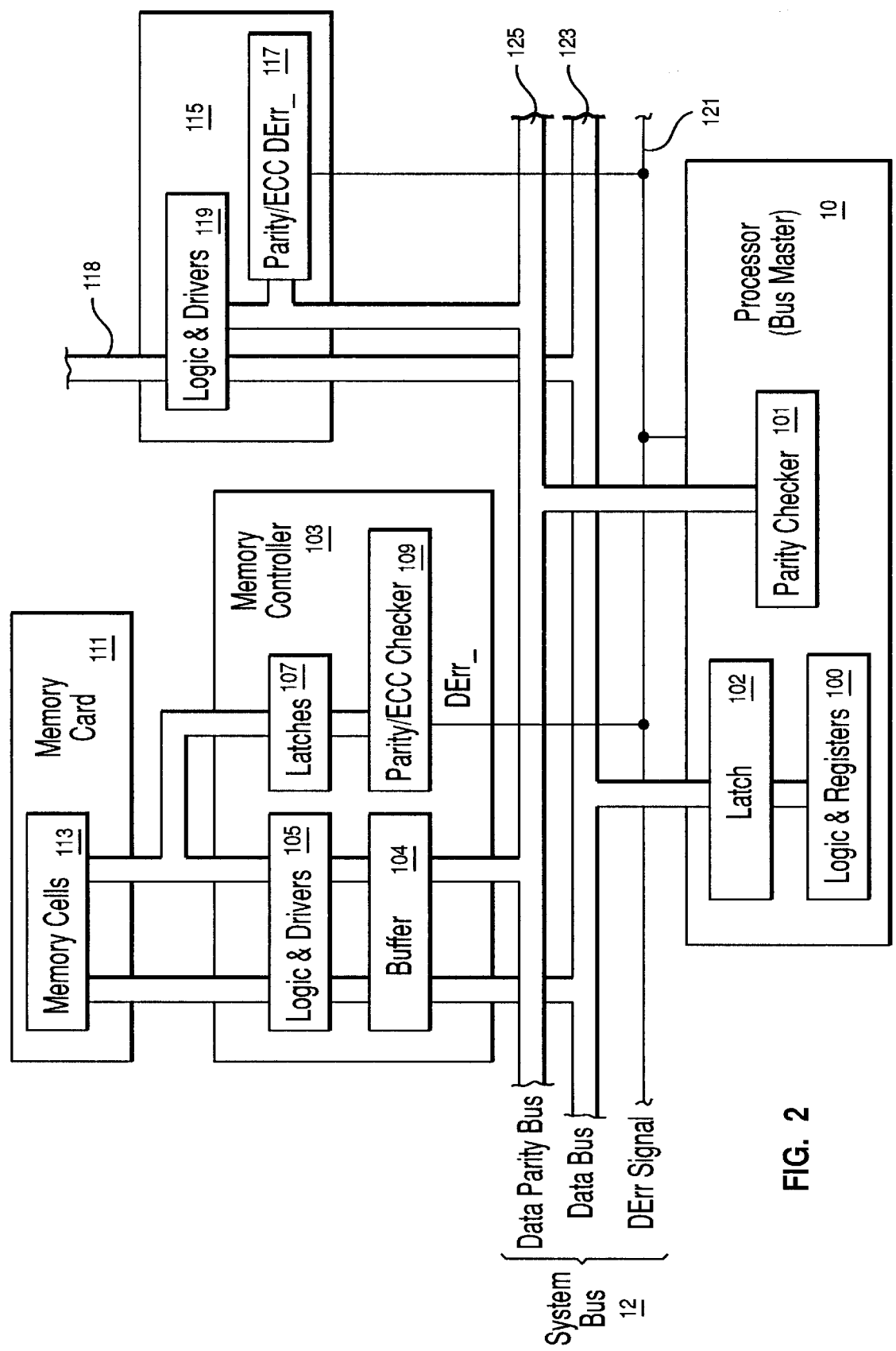
FIG. 2 is another block diagram of the actual devices which implement the present invention.

FIG. 2 is a more detailed block diagram of the individual components of a data processing system which actually implements the present invention. A central processing unit 10 is shown having latch 102, along with logic and registers 100 which receive data from data bus 123. This logic portion 100 is that part of the CPU which reads data (or instructions) from various locations in memory, I/O or other peripheral devices. CPU 10 also includes a parity checker 101 which is capable of performing a parity check on the data that is read from bus 123. A parity check is a redundancy check by which a recalculated parity bit is compared to a pregiven parity bit. That is, the number ones or zeros in an array of binary digits are checked to determine whether the number is odd or even. A parity bit is a binary digit appended to a group of binary digits to make the sum of all the digits, including the appended digit, either odd or even as preestablished. The check bit may also be appended to an array of binary digits to make the sum of all the binary digits, including the check bit always odd or even.

PIO device 115, such as an input/output channel controller (IOCC), communications adapter, small computer system interface (SCSI) adapter, or the like includes logic and registers 119 for implementing the specific functions for which it was designed, e.g. communicating with a network. I/O bus 118, such as a Microchannel Architecture (MCA) bus (Microchannel is a trademark of IBM), is shown which allows input/output adapter cards which control peripheral devices, including graphics, keyboard, and the like to be connected to the data processing system. Additionally, PIO device 115 may include parity and ECC logic portion 117. Thus, device 115 is capable of checking the parity of the data which it writes to data bus 123. Further, device 115 may include ECC capability which allows the device to not only detect errors, but also to correct single bit errors in the data.

The parity and ECC portion 117 of I/O device 115 also control the Derr_ signal (see FIG. 3) which communicates the existence and location of an error to the processor. The operation of the Derr_ control signal will be discussed in more detail in conjunction with FIGS. 3–5.

Memory controller 103 is provided which coordinates the read and write operations between processor(s) 10 and memory cells 113 on memory card 111. Memory cells 113 actually store the data words at a specific address and may be dynamic random access memory (DRAM) chips, or the like. The address will store not only the bits which represent the data itself, but also the parity and/or ECC bits. Memory controller 103 includes logic and drivers 105 which interpret which address contains the data desired by processor 10, (for a load/fetch operation) and determines at what address new data from the processor 10 should be stored (for a store operation). Memory controller 103 also includes parity and ECC checker 109 which determines if an error condition is present, and if so, whether it is a correctable single bit error. More specifically, ECC logic checks and corrects single bit errors and detects multibit errors, such as double or triple bit errors. The ECC logic 109 uses a Hamming code which does the actual detection and correction (of single bit errors). The present invention will be described using a system that detects single and double bit errors, and corrects single bit errors, However, it should be understood that the scope of the present invention includes systems using Hamming codes which detect single, double and triple (or the like) errors, and correct single and double bit errors. Internal buffer 104 is included which stores the data from memory cell 113. As will be discussed below, buffer 104 initially stores the raw (unchecked or corrected) data word which is present at the address in memory cell 113. Processor 10 is then able to read this data and use it without the latency associated with error checking and correction. The parity/ECC checker logic 109 subsequently updates the buffer with the corrected data (if an error is present) such that the processor has access to the corrected data when parity checker 101, in CPU 10, determines that an error is present and parity/ECC checker 109 has corrected the data.

Conventional ECC logic using Hamming codes in conjunction with specific parity bits and ECC bits to detect and correct single bit errors and to detect double, triple and other multibit errors are well known in the art and will not be further described.

However, the present invention utilizes a Hamming code which provides all of the normal ECC functions, but allows the parity and ECC bits to be shared. That is the same bits can be used as parity bits and ECC bits. This reduces the number of pins (I/Os) on a chip since some of the pins can be used for both parity and ECC.

The present invention provides a critical path from the memory, through logic 105 in memory controller 103 such that data is directly provided from a memory location 113 to the internal buffer 104. Conventional techniques require the data to pass through single bit error detection logic, e.g. logic 109 in memory controller 103, which is considered deep logic and requires at least one-fourth cycle. The present invention allows Hamming codes that work with the shallow logic in the critical path (through logic 105 of memory controller 103), and the deep logic in the SBE/ECC path (logic 109). Hamming codes may be used which allow the critical path to be bypassed, i.e. the present invention provides error detection (SBE/ECC) to be eliminated from the critical path (direct data transfer from memory to the internal buffer of controller 103) with regard to each packet of data to be transferred.

Parity and ECC checker 109 also includes the ability to control the Derr_ signal, as will be discussed below. Latches 107 hold the parity and ECC bits while the parity and ECC checker logic perform the error checking operations.

As can be seen from FIG. 2, data parity bus 125 interconnects the memory cell 113 of memory card 111, logic 119 and parity/ECC checker 117 of PIO device 115 with the parity/ECC checker 109 of memory controller 103 and the parity checker 101 of processor 10. In this manner each of the components shown have access to the parity and ECC bits. Further, Derr_ signal line 121 interconnects parity/ECC checkers 109, 117 and parity checker 101 in memory controller 103, PIO device 115 and processor 10, respectively. The parity/ECC checkers in the memory controller 103 and PIO device 115 drive the Derr_ signal active when a parity error is encountered in the data that was placed on bus 123, while processor 10 monitors signal line 121 to determine whether an error condition has been found by the memory controller or PIO device.

Figure 3:
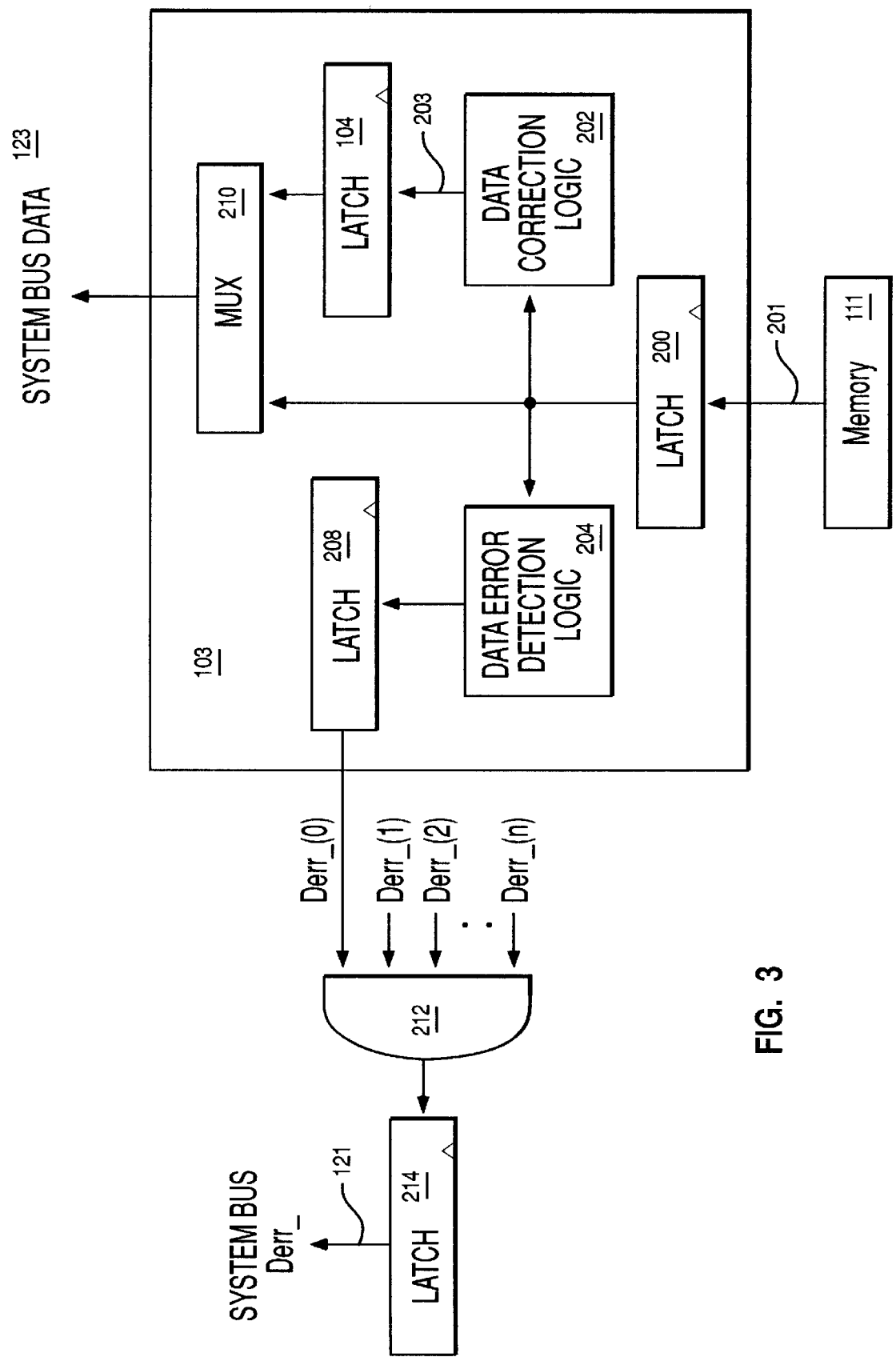
FIG. 3 is a block diagram showing and example of the type of components used to generate the Derr_ signal of the present invention.

FIG. 3 is a block diagram of the components in memory controller 103 which implement the present invention. It should be noted that FIG. 3 will be described with regard to memory controller 103, however, the scope of the present invention includes components in other data providing devices, such as I/O, PIO, or the like, which control a Derr_ signal.

More particularly, FIG. 3 shows memory 111 connected to memory controller 103. When CPU 10 requests data from memory 111, the data is sent to a latch 200 in controller 103 via memory bus 201. Latch 200 captures the raw data from memory 111 and then sends it to multiplexer (MUX) 210. The path from memory 111 to latch 200 to MUX 210 is the "critical path" for the data. This allows raw data to be sent to CPU 10 without any latency associated with parity/ECC checking.

At the same time the raw data is provided from latch 200 to bus 123, via MUX 210, it is provided to data correction logic 202 and data error detection logic 204. Detection logic determines if the raw data includes any errors, and if so, whether they are correctable (e.g. single bit errors). Concurrently, correction logic 202 corrects the raw data when a single bit error is found. Once correction logic 202 has performed the correction, the valid data is then provided to internal buffer 104, which is a latch that captures the data from logic 202 and drives it onto bus 123 through MUX 210. When a single bit error has been found, detection logic 204 outputs a Derr__(n) signal to latch 208. In this case, "n" refers to individual device in the data processing system that is providing the data to the CPU. For example, memory controller 103 may correspond to Derr__(0) and an I/O device may correspond to Derr__(1). Latch 208 then provides the Derr__ signal to an "AND" gate 212 which ANDs all of the Derr__(n) signals for all of the data providing devices in the data processing system. In the preferred embodiment, Derr__ is a negative active signal. Thus, an AND gate is used so that when all of the Derr__(n) signals from the various devices are "ANDed" together, the output of AND gate will be a logical "0" if any one of the Derr__(n) signals is active (logical 0). The remaining Derr__(n) signals will be inactive (logical 1) since they are not providing data. Latch 214 captures the output of AND gate 212 and drives the system bus Derr__ signal active when a corrected error is found by detection logic 204.

Figure 4:
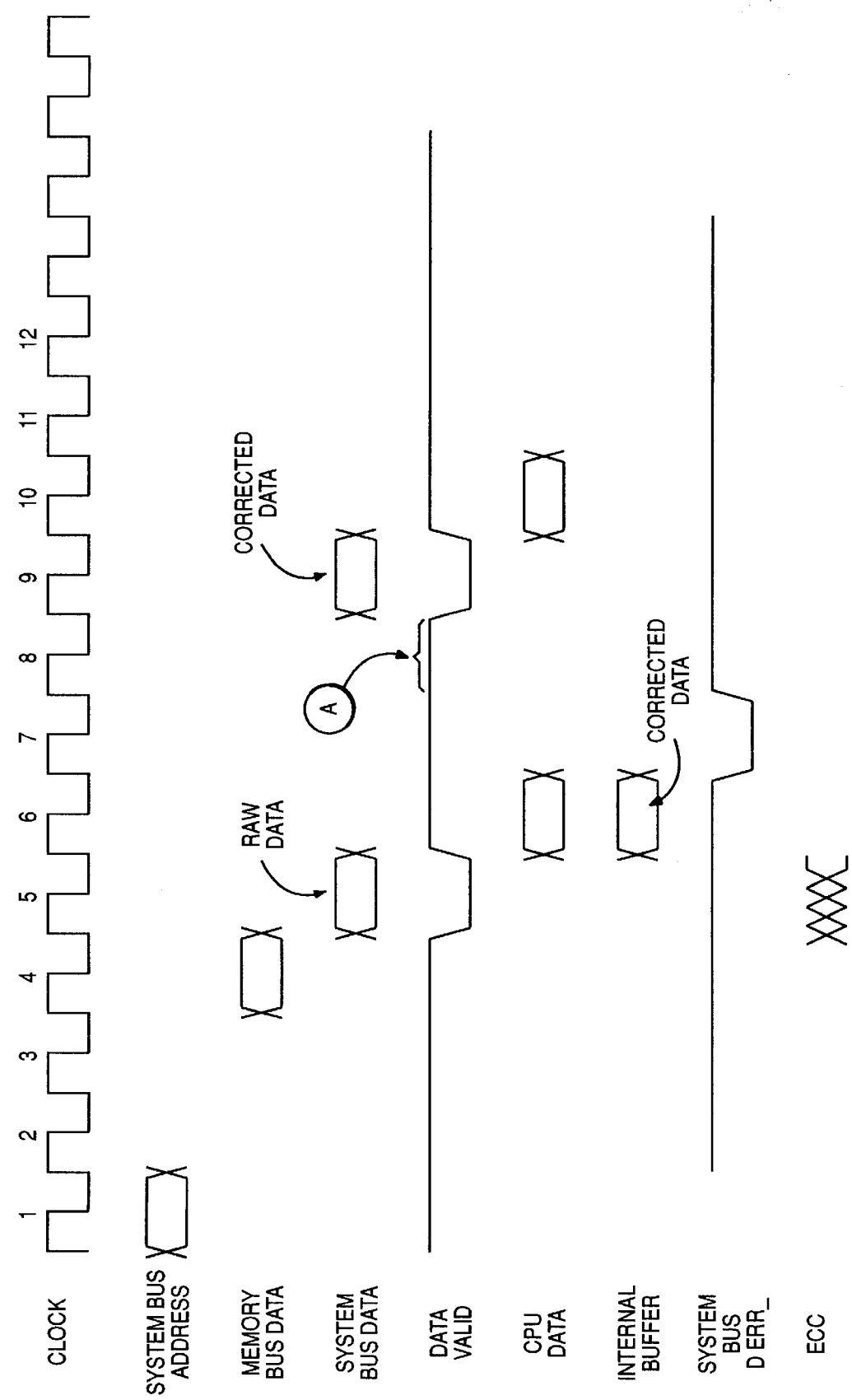
FIG. 4 is a timing diagram illustrating the sequence of events representing the operations of the present invention.

FIG. 4 is a timing diagram of a typical data transfer operation wherein processor 10 desires to read data from memory 111. The memory subsystem (controller 103 and memory card 111). Initially, processor 10 places a request for data on the address bus in cycle 1, i.e. the CPU has requested data from a specific address in memory. The raw data, including parity is then driven onto memory bus 201 at cycle 4. This raw data is then captured into latch 200 and driven onto data bus 123 at cycle 5. Additionally, controller 103 activates a data valid signal indicating to the processor that the data is available for use. At cycle 6, the CPU captures the data in latch 102 and checks the parity early in the cycle. If there are no parity errors found then the CPU begins processing data by forwarding it to the execution units, or the like (also during cycle 6).

At the same time, the data correction logic 202 and detection logic 204 checks the raw data for correctable and uncorrectable errors. If detection logic 204 determines that there are no errors, then detection logic 204 will not activate the Derr__ control signal. Data correction logic 202 always provides corrected data to latch 104 (independent of single bit errors). Of course, if a multibit error occurs, latch 104 may not contain correct data.

FIG. 4 also illustrates the situation when a correctable error is found in the raw data in latch 200. As noted above, the raw data is initially driven onto bus 123 at cycle 5. At the same time detection logic 204 determines there is a correctable error and informs latch 208 to activated Derr__(0). Additionally, the data correction logic 202 corrects the data in cycle 5 and latch 104 captures the corrected data in cycle 6. Also, during cycle 6, CPU 10 has determined that a parity error exists, which is a signal to the CPU to wait two cycles and then check signal line 121 for the Derr__ signal to see if it is active. Therefore, in accordance with the present invention, when CPU 10 checks signal line 121 during cycle 7, it will recognize that Derr__ is active. As noted above, detection logic 204 has activated the Derr__ signal because a correctable error was found in the raw data in latch 200. Once the CPU determines that Derr__ is active, then it knows to obtain the corrected data from internal buffer 104. The processor 10 will obtain the corrected data at some period of time after it recognizes that Derr__ has gone active. This time period "A", shown in FIG. 4, may be as early as the next cycle after the Derr__ signal is active, or several cycles later, depending on the design point of the data processing system. The memory controller will again drive the data valid signal active indicating to the CPU that it can use the corrected data. In the example of FIG. 4, the corrected data is placed on the system bus at cycle 9. During cycle 10, the corrected data is then captured by the CPU in latch 102 at cycle 10 for use by the execution units, or the like.

Finally, for uncorrectable errors found in memory (i.e. multibit errors) it is well known in the art for the memory controller to issue a machine check interrupt to the processor which halts data processing activity and invokes diagnostic routines, and the like, to determine the cause of the error.

Figure 5:
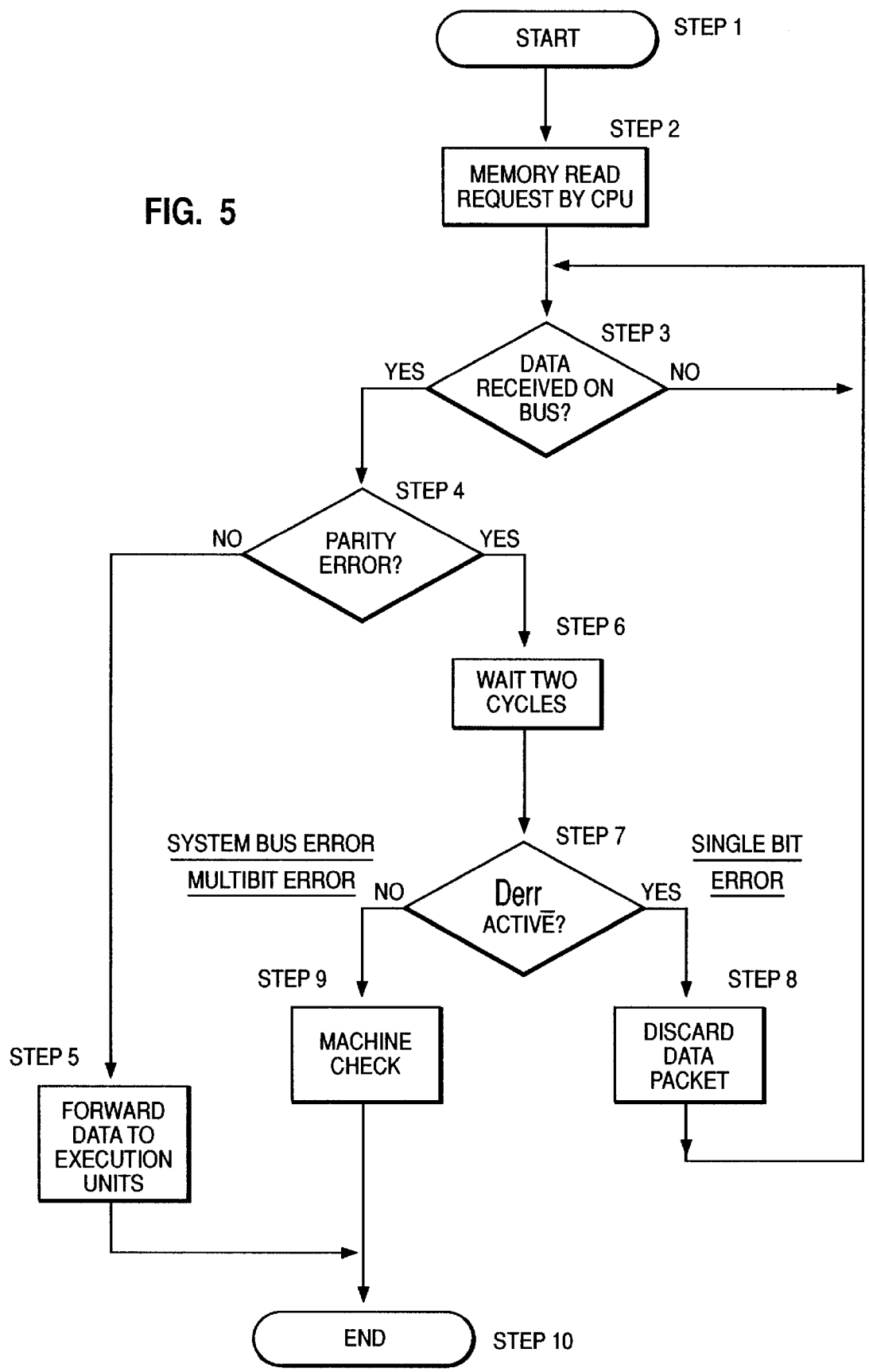
FIG. 5 is a flow chart of the sequence of operations implemented by the present invention to isolated the cause of any errors present during a transfer of data.

FIG. 5 is a flow chart showing the steps utilized by the present invention. At step 1 the process is started and the processor issues a memory read (i.e. load or fetch) instruction at step 2. At step 3 the present invention determines whether the data requested by the processor is received on the bus. As noted above, unchecked raw data from memory is placed on the bus directly without waiting for parity or ECC operations to be completed by the memory controlled. If the raw data is not on the bus, then the process loops back until the data from memory is present on the bus. If, at step 3, it is determined that the data has been received on the bus, then the process continues to step 4 where the CPU begins processing when parity checker 101 determines if there is a parity error for the data that was received on the bus. If there is no parity error found at step 4, the data is forwarded to the execution unit(s) in processor 10 at step 5. In this instance, the raw data was determined to be valid and the data is forwarded to the execution units without the latency normally associated with the parity and ECC operations which occur in the memory controller. Subsequent to step 5 the process of the present invention continues to step 10 and ends.

If at step 4, it is determined by parity checker 101 in CPU 10 that a parity error does exist for the raw data from memory, then the system waits two cycles (step 6) and then checks Derr__ signal line 121, at step 7, to determine whether the Derr__ signal has been activated by the data provider, e.g. memory. If it is determined at step 7 that the Derr__ signal was not driven active by the memory, then the processor knows that a major fault has occurred, such as a system bus failure. In this case, the process continues to step 9 where a machine check interrupt is issued and data processing is stopped while diagnostic routines, or the like are run. Subsequent to step 9 the process of the present invention ends at step 10.

However, if at step 7 it was determined that the data provider, such as memory controller 103, has driven Derr__ active, then the CPU knows that a correctable single bit error has occurred and the previously received raw data is discarded at step 8. During the previously implemented steps 3–7, the parity/ECC checker 109 in memory controller 103 has been checking and correcting the raw data provided to data bus 123 at step 3. If a correctable single bit error was present, then the parity/ECC checker 109 concurrently corrects the SBE and updates internal buffer 104, such that the corrected data is already present in the buffer 104 when the process returns to step 3 to receive the requested data. It should be noted that when a SBE is found and corrected by parity/ECC checker 109, the processor does not have to reissue the memory read request (step 2), but merely receives the data from the bus 123 at step 3. As noted above, this saves additional processing time and overhead since the CPU is not required to reissue a load instruction. Subsequent to step 3, the process of the present invention continues as previously described.

Those skilled in the art will understand how the vast majority of the time steps 1–5 and 10 will be implemented sequentially, since the raw data normally does not contain errors. Further, when an error does occur it will usually be a correctable SBE and steps 1–4 and 6–8 are implemented in that order. This is also an improvement over prior art systems, due to the fact that the present invention eliminated the conventional latency period for parity/ECC checking and the existence of a SBE is known sooner than it would have been in prior art systems. Therefore, instead of initially waiting for the data to be checked for errors, and then waiting again while the parity/ECC checker corrects the data and then reissuing another fetch request, the present invention immediately receives the corrected data since the parity/ECC checker has corrected the data concurrently with the other data transfer operations. Only in a very few instances will steps 1–4, 6, 7, 9 and 10 be implemented in that sequence since the type of serious system errors detected by these steps occur very rarely.

The error reporting protocol of the present invention can be extended to data providing devices which do not include ECC capability. For example, an PIO device which includes parity checking logic only, with no ECC. In this case, when the PIO device is the data provider, a determination of bad parity coupled with an active Derr_ signal will inform the CPU that an error has occurred, and further information in the form of a data status packet will be provided. This data status packet includes information, such as an address on an I/O bus 118 which will allow the CPU to isolate the fault and take corrective action to resolve the error condition. However, in the case where an I/O device does include ECC checking logic, it will correct the raw data and provide the correct data using the Derr_ protocol in the same manner as previously described with respect to the memory subsystem 111, 103 (FIGS. 3–5).

The previous description of the present invention in conjunction with FIGS. 4 and 5 used a single packet of data. However, those skilled in the art will understand how multiple packets, or "beats" of data can be used by the apparatus and method of the present invention to give identical results.

The present invention allows a processor to utilize data as soon as it is available from a memory or I/O subsystem without having to sit idle, while parity and ECC operations occur. Further, a buffer is included which allows, in the event of a correctable error, the processor to read the data without the further latency of reissuing a fetch request to the memory. Also, a Derr_ signal is provided which indicates to the CPU whether a correctable error is located in the memory subsystem, or is a more serious system bus fault or uncorrectable multibit error. This will allow the processor to determine whether the error is in a peripheral device that may be correctable, or if a system level fault requiring machine level corrective action is present.

To summarize, the present invention uses a determination of bad parity by the CPU and the state of the Derr_ signal as a functional signal indicating that a specific type of error has occurred in a particular component of the data processing system. If the Derr_ signal is active, the parity error recognized by the CPU was caused by a correctable condition in a data providing device. In this instance, the processor will be supplied with the corrected data from a buffer without reissuing a fetch request instruction. When the CPU finds a parity error, but Derr_ is not active a more serious fault condition is identified requiring a machine level interrupt, or the like. And, when no parity error is found by the CPU, then the data is known to be valid and the parity/ECC latency is eliminated, thereby saving processing cycle time. In this manner, the present invention not only saves time and overhead by eliminating the parity/ECC latency, but also by identifying a specific type of fault condition which can be corrected to allow processing operations to continue unencumbered without the necessity of issuing additional fetch instructions.

Although certain preferred embodiments have been shown and described, it should be understood that many changes and modifications can be made therein without departing from the scope of the appended claims.

We claim:

1. A method of transferring data in a data processing system from a data providing device to a processor, comprising the steps of:

requesting, by said processor, said data from said device;

providing said data directly to said processor without checking said data for an error condition;

determining at said data providing device whether an error condition exists in said data;

generating a control signal indicating the existence of an error condition in said data;

correcting said data by said data providing device when said error condition exists;

storing corrected data in a specialized buffer of the data providing device; and supplying said corrected data to said processor from said specialized buffer in said data providing device.

2. A method according to claim 1 wherein said step of storing comprises the step of placing said corrected data in an internal buffer of said data providing device accessible to said processor in response to said generated control signal.

3. A method according to claim 2 wherein said step of generating further comprises the step of transmitting said control signal from said device to said processor when a correctable error condition exists in said data.

4. A method according to claim 3 wherein said step of storing further comprises the step of placing error status information, to be read by said processor, in said internal buffer when said error condition is uncorrectable.

5. A data processing system wherein data is transferred from a data providing device to a processor, comprising:

means for requesting, by said processor, said data from said device;

means for providing said data directly to said processor without checking said data for an error condition;

means for determining at said data providing device whether an error condition exists in said data;

means for generating a control signal indicating the existence of an error condition in said data;

means for correcting said data by said data providing device when said error condition exists;

means for storing corrected data in a specialized buffer of the data providing device; and means for supplying said corrected data to said processor from said specialized buffer in said data providing device.

6. A system according to claim 5 wherein said means for storing comprises means for placing said corrected data in an internal buffer of said data providing device accessible to said processor in response to said means for generation of a control signal.

7. A system according to claim 6 wherein said means for generating further comprises means for transmitting said control signal from said device to said processor when a correctable error condition exists in said data.

8. A system according to claim 7 wherein said means for storing further comprises means for placing error status information, to be read by said processor, in said internal buffer when said error condition is uncorrectable.

9. A system according to claim 8 wherein said data providing device is a memory controller.

10. A system according to claim 9 wherein said means for correcting comprises means for detecting a non-correctable error condition in said data.

11. A system according to claim 10 wherein said means for correcting comprises error checking and correction logic.

12. A system according to claim 11 wherein said means for determining whether an error condition exists in said data further comprises parity error detection logic.

* * * * *